United States Patent [19]

Cipelletti

[11] Patent Number: 4,701,054
[45] Date of Patent: Oct. 20, 1987

[54] MIXING SCREW FOR ICE-CREAM PRODUCTION APPARATUSES

[75] Inventor: Alberto Cipelletti, Via Emilia, Guardamiglio, Italy, 20070

[73] Assignee: Ditta Alberto Cipelletti, Italy

[21] Appl. No.: 735,874

[22] Filed: May 20, 1985

[30] Foreign Application Priority Data

May 18, 1984 [IT] Italy .............................. 21844/84[U]
May 18, 1984 [IT] Italy .............................. 21847/84[U]

[51] Int. Cl.⁴ .......................... B01F 7/18; B01F 15/06
[52] U.S. Cl. ....................................... 366/312; 165/94
[58] Field of Search ............... 366/312, 309, 310, 313, 366/149, 147, 144, 65, 66, 279, 205, 314, 325, 326, 330, 329, 331, 342, 343; 15/236 R, 93 R; 165/94; 62/342, 343

[56] References Cited

U.S. PATENT DOCUMENTS

| 832,241 | 10/1906 | Cranston | 366/309 |
| 1,779,571 | 10/1930 | Ullgren | 366/312 |
| 2,793,505 | 5/1957 | Finch | 366/312 |
| 2,858,117 | 10/1958 | Girton | 366/312 |
| 3,161,404 | 12/1964 | Jay | 366/312 |
| 4,540,288 | 9/1985 | Pandolfi | 62/342 |

Primary Examiner—Robert W. Jenkins
Attorney, Agent, or Firm—Lerner, David, Littenberg, Krumholz & Mentlik

[57] ABSTRACT

The invention relates to a screw for apparatuses for ice-cream production with a vertical whipping vessel. The screw comprises at least one supporting metal blade, fixed to a rotating hub and carrying clutches for removably and substitutably fixing thereon a scraping vane. The screw may further comprise at least a mixture spreading vane acting in cooperation with said scraping vane.

6 Claims, 5 Drawing Figures 4,701,054

MIXING SCREW FOR ICE-CREAM PRODUCTION APPARATUSES

BACKGROUND OF THE INVENTION

1. Field of the Invention

This invention concerns a mixing screw for apparatuses for ice-cream production, in particular for apparatuses having a whipping vessel with vertical axis.

2. Description of the Prior Art

Apparatuses for handicraft production of ice-cream, comprising a whipping vessel with vertical axis under conditions of thermal exchange with the evaporator of a refrigerating circuit inside which a mixing screw is housed and is turned by a shaft coaxially protruding from the bottom of the vessel itself, are known. The mixing screw, besides performing the operation of mixing and homogenizing the mixture to be freezed, must also carry out the function of improving thermal exchange between the mixture and the cooled walls of the whipping vessel. For this purpose the known mixing screws generally comprise vanes capable of mixing the mixture to be freezed in the whipping vessel and of scraping off the cooled mixture from the walls in order that new mixture continuously comes into contact with the walls themselves. The two functions are generally performed by a single type of mixing-scraping vane, but it is also possible to have one or more vanes with only a mixing function. The scraping vanes have the inconvenience that their edges rapidly wear out, due to their continuous action of scraping on the bottom and on the side wall of the vessel, and said wear limits their duration, so that, after a certain time of use, it is necessary to substitute the same, with considerable incidence on maintenance costs.

OBJECTS OF THE INVENTION

An object of the present invention is therefore to obviate to the abovesaid drawback, by a mixing screw which does not need a complete substitution in case of wear or in case its vanes are out of use.

Another object is to speed up and facilitate cleaning operations when the ice-cream production in over, avoiding any recess where accumulation of the treated products may occur.

Still another object of the invention is to provide a mixing screw which performs, in comparison with mixing screws known up to now, a better smearing action of the mixture on the walls of the whipping vesesl so as to obtain the maximum possible thermal exchange between the mixture and the walls of the vessel itself.

The mixing screw for apparatuses for ice-cream production with vertical whipping vessel according to the present invention is characterized in that it has a central hub provided with one or more supporting blades, placed in inclined position with respect to their rotation plane and having clutches designed to receive matching clutches provided on one or more insertable scraping vanes, to fix in a removable and substituable way said vanes on said supporting blades, said vanes having edges designed to to slide on the bottom and/or the side wall of the whipping vessel.

Therefore the screw has no longer to be completely substituted in case of wear, but it is sufficient to substitute the insertable vanes. The supporting blades are made of metal and have such a surface as to give the necessary stiffness for the mixing action to the insertable vanes, considering that they are preferably made of plastic material.

According to another characteristic of the invention, said mixing screw comprises, besides at least one scraping vane, at least an L-shaped spreading vane having its horizontal section and vertical section respectively adjacent to the bottom wall and the side wall of the whipping vessel, the horizontal section and the vertical section of the vane being moreover inclined in a way as to form, with the bottom wall and the side wall of the vessel, respectively, an angle having the apex turned in the opposite direction to the direction of rotation of the screw.

Said vane, thanks to its particular configuration and inclination, tends to uniformly distribute and to squash the mixture to be freezed, against the vessel walls, each time defining a mixture layer in which an effective thermal exchange occurs between the mixture and the walls of the vessel itself. The squashing effect of the mixture against the walls of the whipping vessel also contributes to the elimination of ice clots possibly present in the mixture and determines complete homogenization of the mixture.

Further characteristics and advantages of the mixing screw according to the invention will become obvious from the following description, given with reference to the accompanying drawings.

DESCRIPTION OF THE PREFERRED EMBODIMENTS

Figure 1:
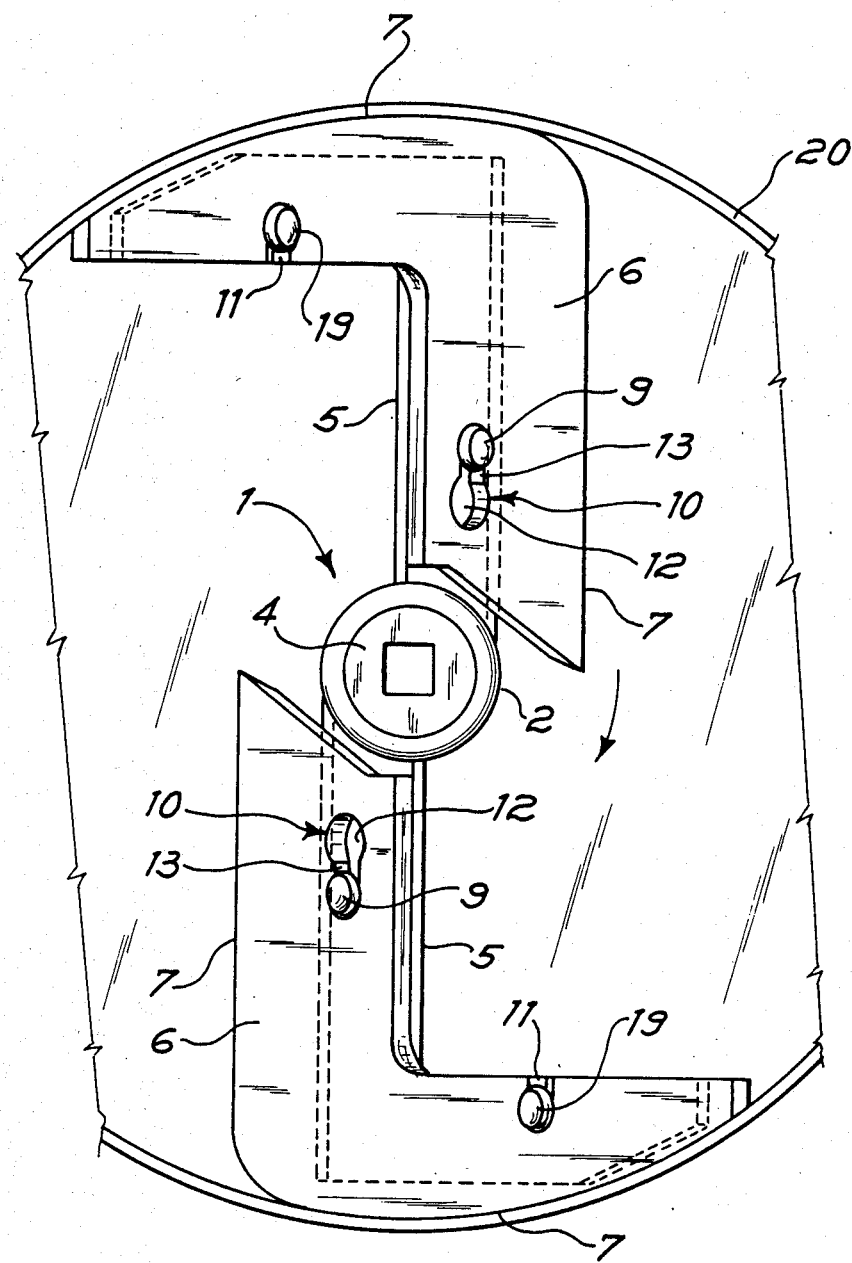
FIG. 1 is a plan view from the top of the mixing screw according to a first embodiment.
Figure 2:
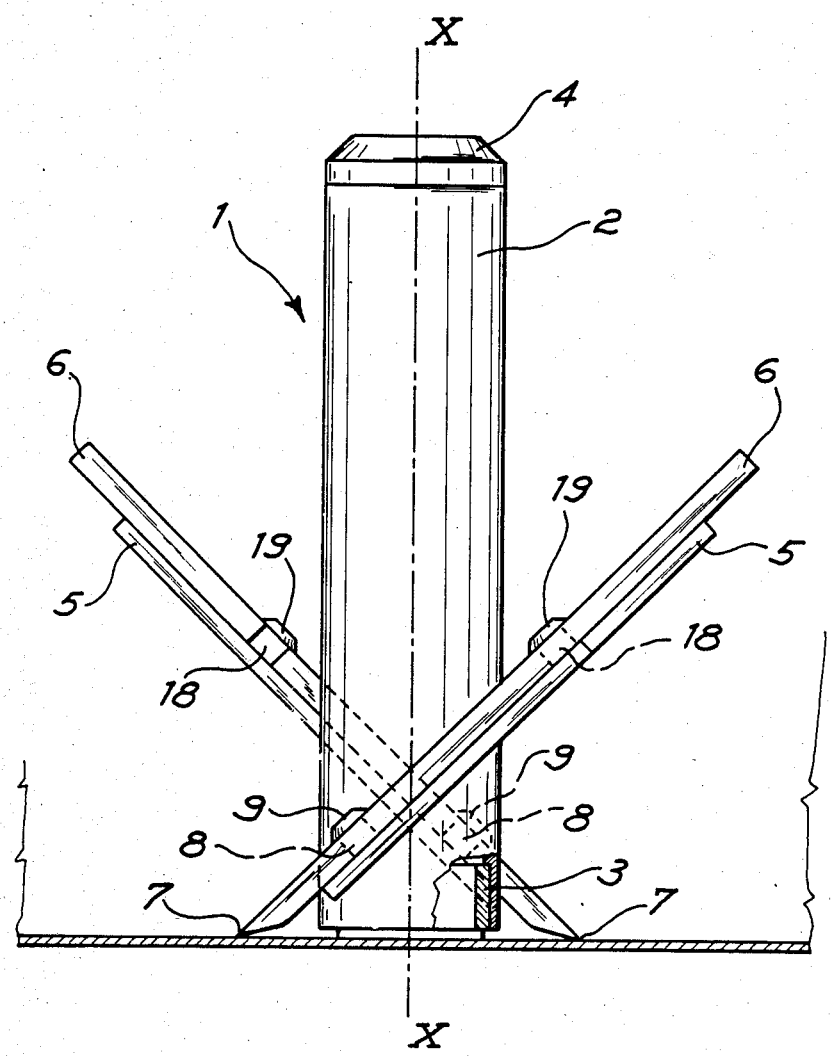
FIG. 2 is a view of the mixing screw shown in FIG. 1 sideways lifted.

As it can be seen from FIGS. 1 and 2, the mixing screw, as shown by reference 1, comprises a sleeve 2 designed to be inserted onto a motor shaft of the apparatus for ice-cream production and having in its lower section, inside, a driving bush 3 and in its upper section an element 4 designed to serve as system for carrying into rotation the screw 1 for coupling with the motor shaft which axially crosses the sleeve. Close to the base of sleeve 2 there are, for instance applied by welding, two diametrically opposite metal blades 5 designed to act as support for scraping vanes indicated by 6, which, in this case, are made of a suitable plastic material.

The vane-holding blades 5 are inclined by a given angle with respect to the rotation axis X—X of the sleeve, so that the scraping vanes 6, once they are fixed to their supporting blades 5, take themselves said inclination. The scraping vanes 6 have the usual edges 7, designed to slide on the bottom and on the side wall of the cylindrical whipping vessel 20 which contains the ingredients necessary for ice-cream production.

The supporting blades 5 have on their upper surface a couple of pivots 8, 18 equipped with heads 9, 19 of larger diameter, while the scraping vanes 6 have, in a corresponding position, couples of slits 10, 11, the first one of which 10 is closed and is keyhole shaped while the other 11 is open on the internal side of the vane. The slit 10 has therefore a circular section 12 having a diameter essentially corresponding to the diameter of the heads 9 of pivots 8, and an elongated section 13 having a width essentially corresponding to the diameter of the shank of pivots 8.

The pivots and slits define male and female joints to connect in a removable way the scraping vanes 6 to the supporting blades 5.

To apply a scraping vane 6 to the relevant supporting blade 5 it is just necessary to insert the head 9 of pivot 8 into the circular section 12 of slit 10, to position the pivot 18 before the entry of slit 11 and then to push vane 6 towards the sleeve 2 in a way that the shank of pivot 8 goes down to the bottom of the elongated section 13 of slit 10 and the shank of pivot 18 goes down to the bottom of slit 11, the heads 9 and 19 keeping in position the scraping vanes on the blades 5, while the side wall 20 of the vessel prevents any movement of the vanes tending to make pivots 8, 18 come out from the relevant seats 10 and 11.

By acting in the opposite direction, the scraping vane 6 can be easily removed from the relevant supporting blade 5, obviously after the whole screw has been removed from vessel 20.

Figure 3:
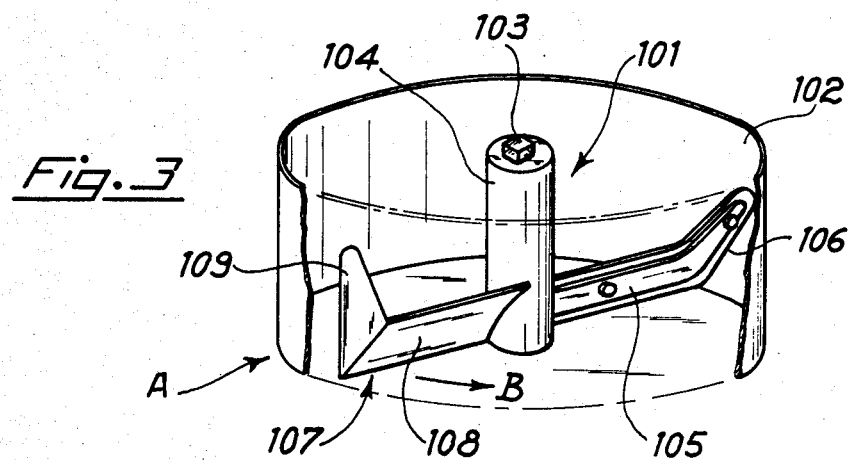
FIG. 3 is a perspective view of another embodiment.
Figure 4:
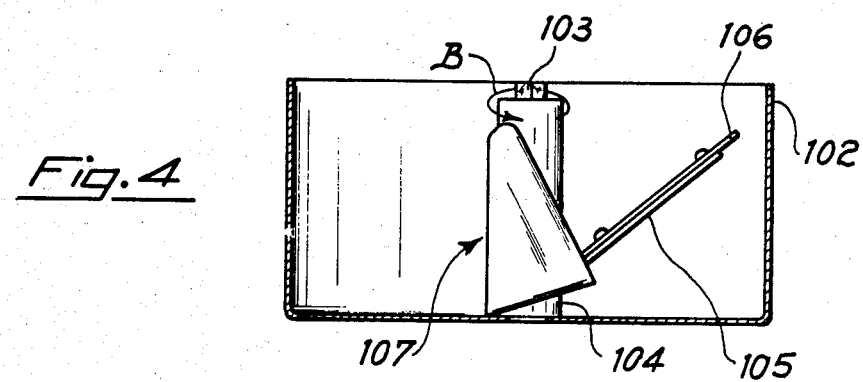
FIG. 4 is a view of the screw according to arrow A of FIG. 3.
Figure 5:
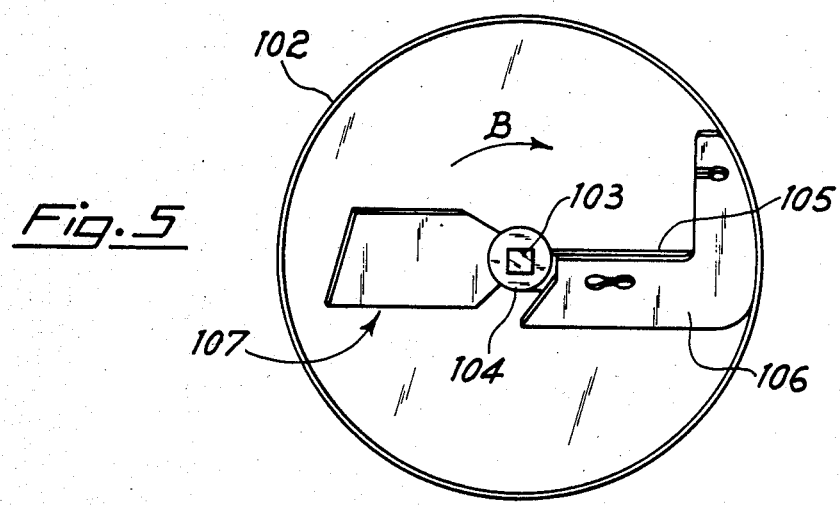
FIG. 5 is a view from the top of the screw.

Another embodiment is shown in FIGS. 3, 4 and 5, where a mixing screw 101 is positioned in a whipping vessel 102 with vertical axis of an apparatuses for handicraft production of ice-cream or of an ice-cream apparatus for family use. The walls of the whipping vessel 102 are cooled by the evaporator of a refrigerating circuit, and from the bottom of the vessel, coaxially to the vessel itself, a shaft 103 controlling the screw 101 rotations is protruding. The direction of the rotation of screw 101 is indicated by arrow B in the figures.

The screw 101 comprises a sleeve 104 in which the shaft 103 is coaxially inserted and from which the support 105 of an L-shaped scraping vane 106 is protruding, as previously described. The vane 106 is inclined so as to form with the bottom of vessel 102 an angle having the apex turned in the direction of rotation of the screw; moreover, the edges of the vane 106 turned towards the vessel walls are in contact with the vessel walls themselves. The vane 106, thanks to its configuration, during the rotations of the screw 101 performs a scraping action on the walls of vessel 102 in a way as to remove the cooled mixture and to free the exchange surface in order that new mixture can continuously be cooled.

In a position diametrically opposite to the vane 106, another L-shaped vane 107 is fixed to the sleeve 104, its horizontal section 108 radially protruding from the lower section of the sleeve itself. The horizontal section 108 and the vertical section 109 of the vane 107 are inclined so as to form, with the bottom wall and the side wall of the vessel 102, respectively, an angle having the apex turned in a direction opposite to that of rotation of screw 101. The edges of vane 107 turned towards the walls of the vessel 102 are parallel and close to the vessel walls themselves.

In this way, during the rotations of the screw 101, the vane 107 collects the mixture to be freezed removed from the walls of the vessel 102 by the scraping vane 106 and, thanks to its particular inclination, performs the function of distributing and uniformly spreading the mixture on the whole surface of the vessel walls so as to allow the desired thermal exchange between the mixture and the cooled walls of the vessel itself.

In particular, considering the limited distance of the edges of the vane 107 from the vessel walls, the mixture to be freezed is literally squashed against the walls with further improvement of the thermal exchange and with an advantageous effect in what concerns the elimination of ice clots and mixture homogenization. Furthermore, the limited thickness and the reduced compactness of the mixture squashed by the vane 107 on the vessel walls reduces the load acting on the vane 106 thus improving its scraping effect. Finally, the inclined surfaces 108 and 109 of vane 107 make the mixture to be freezed to roll on itself and then perform a favorable mixing action on the mixture, while the continuous going on of the actions of spreading and scraping improves the ice-cream quality.

I claim:

1. Apparatus for ice-cream production in a whipping vessel with a vertical axis and including an inner surface, said apparatus including a mixing screw comprising a central hub for rotatably mounting said mixing screw within said whipping vessel, supporting blade means rotatably projecting from said central hub and being inclined with respect to the plane of rotation of said supporting blade means, L-shaped spreading vane means radially projecting from said central hub and including a horizontal section affixed to said central hub and the vertical section, said vertical section being configured so as to be proximate to and spaced from said side wall of the whipping vessel, said horizontal section and said vertical section being inclined so as to form with said bottom wall and said side wall of said whipping vessel, respectively, an angle having its apex turned in a direction opposite to the direction of rotation of said apparatus, and removable scraping vane means removably secured to said supporting blade means, including edges designed to slide on said inner surface of said whipping vessel.

2. A screw according to claim 1, wherein each spreading vane is assembled in a position diametrically opposite to that of a scraping vane.

3. Apparatus according to claim 1, further comprising securing means for removably securing said removable scraping vane means to said supporting blade means including a first securing member associated with said supporting blade means and a second securing member associated with said removable scraping vane means, said first and second securing members being interlockable with each other.

4. Apparatus according to claim 3, wherein said securing means includes a plurality of first securing members associated with said supporting blade means and a plurality of second securing members associated with said removable scraping vane means, said plurality of first and second securing members being interlockable with each other.

5. Apparatus according to claim 4, wherein said plurality of first securing members comprise projecting male pivot members, and said plurality of second securing members comprise slit-shaped female members for recovering said projecting male pivot members.

6. Apparatus for ice-cream production in a whipping vessel with a vertical axis and including an inner surface, said inner surface including a horizontal bottom wall portion and a vertical side wall portion, said apparatus including a mixing screw comprising a central hub for rotatably mounting said mixing screw within said whipping vessel, supporting blade means rotatably projecting from said central hub and being inclined with respect to the plane of rotation of said supporting blade means, removable scraping vane means removably secured to said supporting blade means, said removable scraping vane means including edges designed to slide on both said bottom wall portion of said sidewall portion of said whipping vessel.

* * * * *

UNITED STATES PATENT AND TRADEMARK OFFICE
CERTIFICATE OF CORRECTION

PATENT NO. : 4,701,054

DATED : October 20, 1987

INVENTOR(S) : Alberto Cipelletti

It is certified that error appears in the above-identified patent and that said Letters Patent is hereby corrected as shown below:

Column 4, line 66, "of" should read --and--.

Signed and Sealed this

Twenty-sixth Day of April, 1988

*Attest:*

*Attesting Officer*

DONALD J. QUIGG

*Commissioner of Patents and Trademarks*